United States Patent

Debroche

[11] Patent Number: 5,951,815
[45] Date of Patent: Sep. 14, 1999

[54] REMOVABLE THREAD GUIDE WHICH RECEIVES THREADS PROJECTED ONTO A SURFACE

[75] Inventor: Claude Debroche, Cebazat, France

[73] Assignee: Sedepro, Paris, France

[21] Appl. No.: 08/978,068

[22] Filed: Nov. 25, 1997

Related U.S. Application Data

[60] Provisional application No. 60/032,899, Dec. 16, 1996.

[30] Foreign Application Priority Data

Nov. 27, 1996 [FR] France .................................. 96 14633

[51] Int. Cl.$^6$ .................................................... B29D 30/38
[52] U.S. Cl. ............................ 156/397; 156/117; 156/181
[58] Field of Search ...................................... 156/117, 123, 156/121, 130, 397, 177, 178, 181, 441

[56] References Cited

U.S. PATENT DOCUMENTS 3,894,906  7/1975  Pearce et al. .
4,952,259  8/1990  Debroche et al. .
4,992,123  2/1991  Cave et al. .

Primary Examiner—Geoffrey L. Knable
Attorney, Agent, or Firm—Baker & Botts, L.L.P.

[57] ABSTRACT

An apparatus for the manufacture of a reinforcement from a thread directed in its final position by projecting lengths of the thread for laying the thread onto a receiving surface (S). The apparatus includes an assembly (5) having rollers (15) for the advancing of thread (1), a rotary conduit (2), a knife (3) for cutting the thread and freeing a length (10) upon each turn of said rotary conduit (2), and a thread guide (4) to receive the cut lengths of thread. The thread guide includes a cradle (41) provided with a fastening surface (42) which permits the detachable mounting of said thread guide (4) to said assembly (5).

7 Claims, 2 Drawing Sheets

REMOVABLE THREAD GUIDE WHICH RECEIVES THREADS PROJECTED ONTO A SURFACE

SPECIFICATION

This conventional application is also entitled to the priority of provisional application Ser. No. 60/032,899, filed Dec. 16, 1996.

BACKGROUND OF THE INVENTION

The present invention relates, in particular, to the manufacture of tires, and more particularly, to the manufacture of reinforcement armatures, such as those which are present below the tread of belted tires, the carcass of which is generally radial.

Such reinforcements have been manufactured in the form of semi-finished products known as "plies" which were prepared flat and then incorporated in the assembling of the article. U.S. Pat. No. 4,952,259 relates to the producing of such reinforcements from a continuous thread and placing them directly on the tire blank. This proposal is based on the projecting of a thread in the manner of the thong of a whip.

FIG. 1 illustrates an apparatus for the manufacture of a tire reinforcement employing this principle. Such an apparatus uses a thread 1, fed, for example, by feeding means from a spool, not shown. The apparatus projects lengths 10 of said thread onto a receiving surface S, which in this case is part of the tire being manufactured.

The expression "thread" is used herein in a very broad sense to include a monofilament, a multifilament, a cable, a twist or an equivalent assembly, and this whatever the material constituting the thread or the treatment which it has undergone, for instance a surface treatment in order to favor its intimate bonding to rubber, or a rubberizing treatment surrounding said thread with a layer of rubber in order to permit its direct adherence on the support upon its projection.

Said apparatus comprises an assembly 5 which includes:
means for advancing the thread 1 from a source of thread (not shown), such as a spool,
a rotary conduit 2 mounted on a shaft 20 constituting the axis of rotation of said conduit, in such a manner that the outer radial end 21 of said conduit is directed substantially radially with respect to the axis of rotation, said conduit receiving the thread 1 at its central end 22 opposite said outer radial end 21 coming from the thread feeding means, said thread emerging through said outer radial end, said feeding means controlling the linear speed of advance of the thread within said rotary conduit,
means for driving said rotary conduit 2 in rotation,
means for cutting the thread in such a manner as to free a length upon each rotation of said rotary conduit 2.

Furthermore, said apparatus comprises a thread guide, designated generally as 4, for receiving lengths 10 of thread. For further details as to the operation of an apparatus of this type, reference should be made to U.S. Pat. No. 4,952,259. In that apparatus, the thread guide 4 is positioned with respect to said rotary conduit 2 in such a manner as to receive the thread, or more precisely lengths 10 removed one after another from this thread, in the plane of rotation of said conduit 2. The thread guide 4 receives each length 10 of thread, which passes through this thread guide and emerges through a projection orifice 40 (FIG. 2) in the immediate vicinity of the surface on which the length of thread is to be deposited and held by adherence.

SUMMARY OF THE INVENTION

The object of the present invention is to simplify the production of such a thread guide and to facilitate the use of such a thread-laying apparatus for a wide range of manufactured articles, for example for a range of tires of many different types, involving different dimensions of crown reinforcements, curved to a greater or lesser extent on the surface onto which the lengths of thread are projected, and also different types of threads.

According to the invention, the thread guide comprises a closed cradle provided with a simple, localized fastening surface which permits the detachable mounting of said thread guide to said assembly, said cradle having a pair of deflectors which define at least one elongated inner corridor placed in said plane of rotation, the deflectors being arranged in such a manner as to leave between them a slot into which each length of thread can pass, each deflector having on the discharge side, an edge which is curved in such a manner as to approach the shape of said receiving surface.

The thread guide is a compact subassembly which is mounted on the frame of the thread-laying apparatus proper. It is mounted in a firm but easily detachable manner. Therefore, it is very simple to change the thread guide when desired. One can produce as many thread guides as necessary, for instance as many as there are different curves presented by the surface onto which the lengths 10 of thread are projected. It is therefore no longer necessary to provide a mechanism for adjusting the thread guide to the curvature of the receiving surface. If it is necessary to use a different configuration for the thread guide, this is done very simply by replacing the thread guide itself. Several pre-configured thread guides can be stored, so that this change can be effected very rapidly.

DESCRIPTION OF THE DRAWINGS

All the details of the invention are explained below with reference to the accompanying drawings.

DESCRIPTION OF PREFERRED EMBODIMENTS

Figure 1:
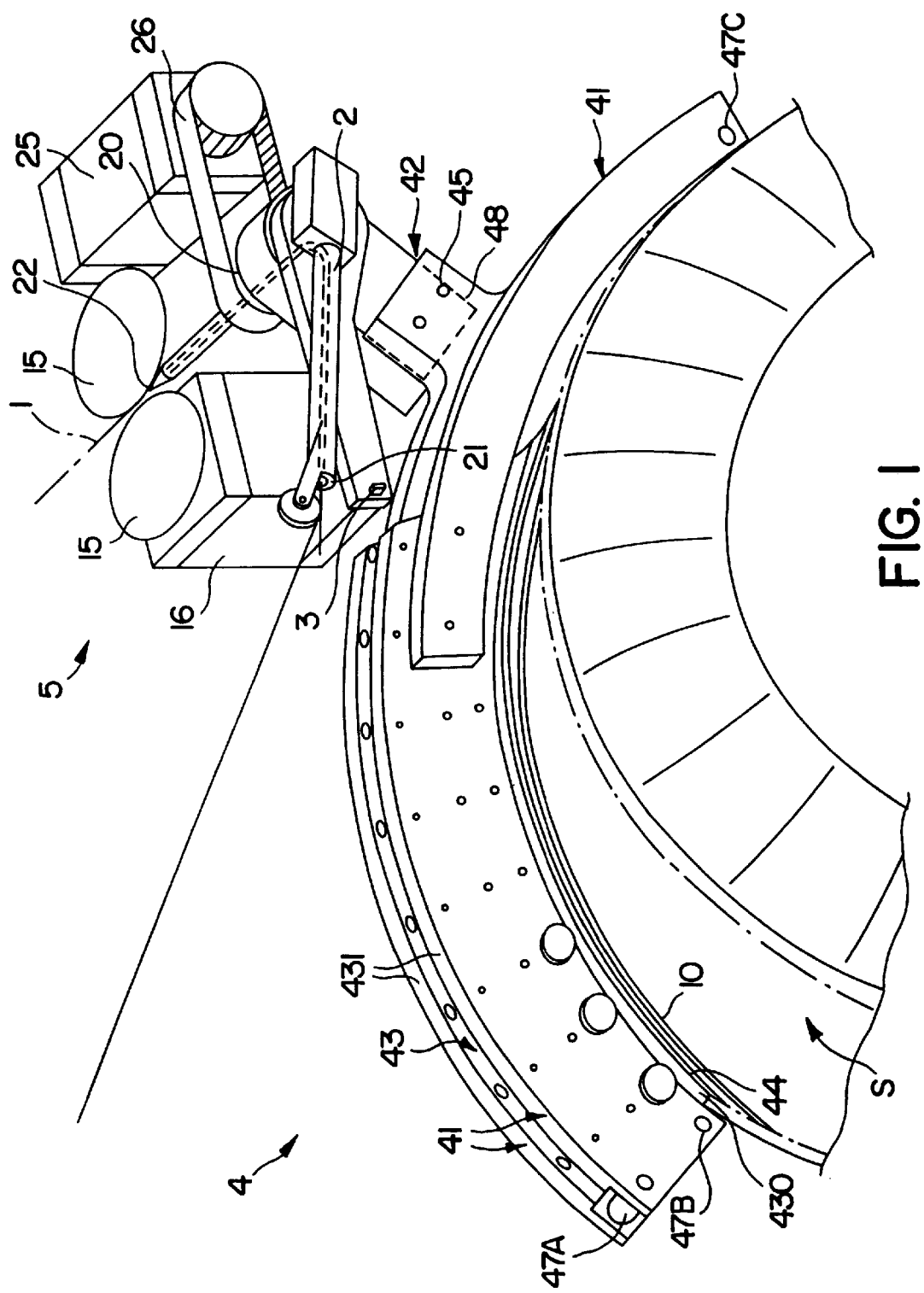
FIG. 1 is a perspective view showing the thread guide of the invention.

FIG. 1 shows the assembly 5, the function of which is to deliver lengths of thread provided with the movement which makes it possible for them to be placed on the surface on which it is desired to deposit them. The thread 1 is fed by rollers 15 between which the thread is gripped. One of these rollers is driven in rotation by the motor 16. A motor 25 drives the shaft 20 by a belt 26. A stationary knife 3, arranged in the path of the thread 1 just downstream of the outer radial end 21, cuts the thread upon each revolution of the rotary conduit 2.

It is important to note that, as compared with all the embodiments described in U.S. Pat. No. 4,952,259 mentioned above, the components of the assembly 5 are arranged in such a manner that all the mechanical parts of the assembly 5 are grouped on a single side of the rotary conduit 2. Stated differently, the drive of the rotation of said conduit and the drive of the thread 1 by the rollers are located on the same side. This is made possible by offsetting the motor 25 with respect to the shaft 20. This makes the mechanical structure very compact and facilitates the design of a single fastening surface 42 of small dimensions as compared with the space taken up by the thread guide 4.

Figure 2:
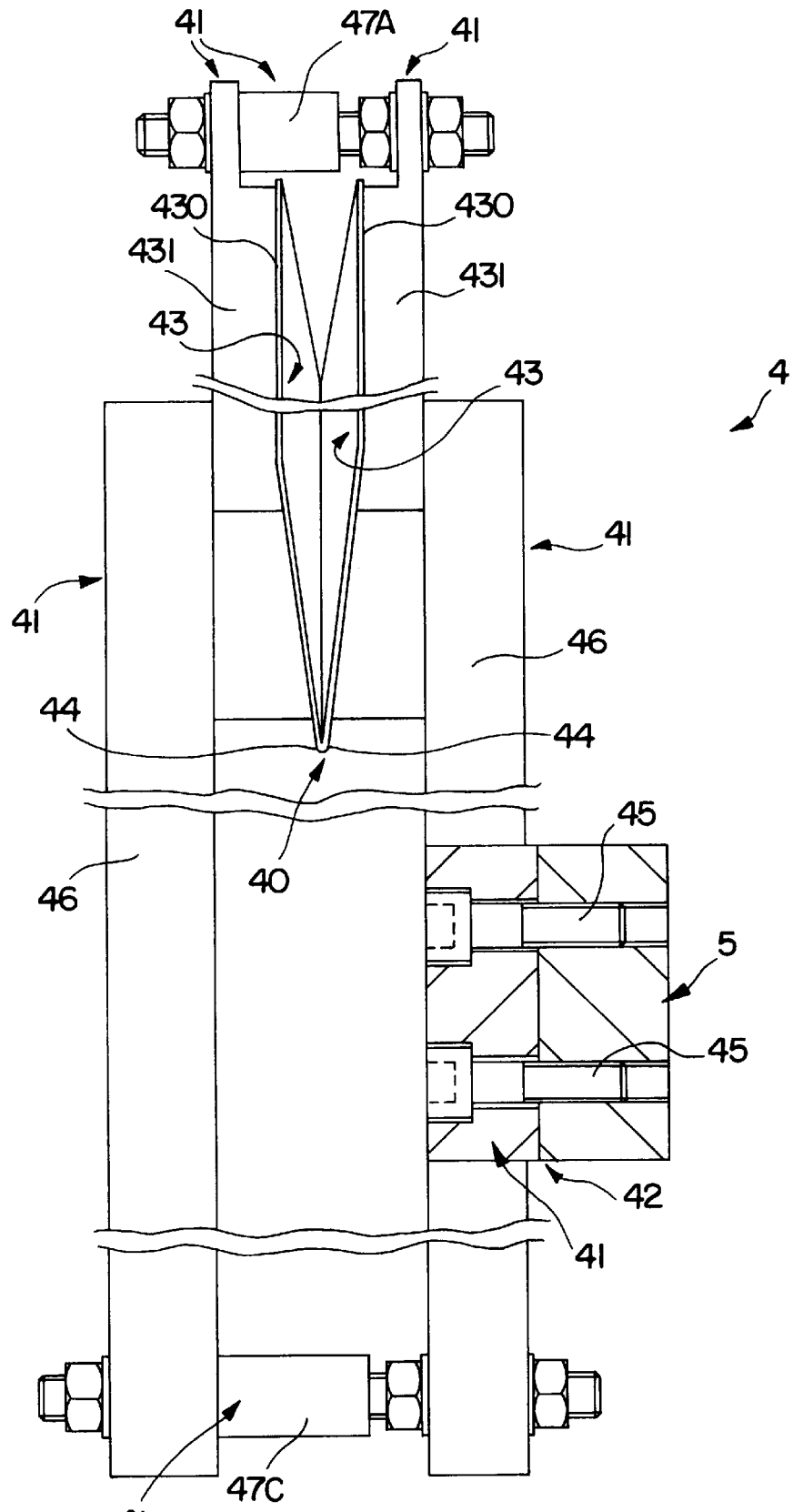
FIG. 2 is another view of part of the thread guide.

It is seen that the thread guide 4 is mounted overhung on the frame of the assembly 5 containing the rotary conduit 2. The fastening surface 42 is a flat surface of a mounting lug located at the interface between the thread guide 4 and the assembly 5 (see FIG. 2). Said surface is continuous and is entirely circumscribed by a closed line 48 (FIG. 1). This single fastening surface is designed to permit the removable fastening of the said thread guide 4 on said assembly 5. For this, one can use a quick-attachment system or even, very simply, screws 45. As the thread guide plays a guiding and braking role in order to assure high precision in the depositing of the lengths 10 of thread, it is important that the fastening surface 42 and the fastening means selected, in this case screws 45, permit a sufficiently firm mounting.

The thread guide 4 includes a closed cradle, designated generally as 41, to include all the parts which constitute it. This cradle 41 includes a pair of deflectors 43 defining an elongated inner passage through which said plane of rotation passes. The deflectors are each formed by a metal sheet 430 fastened on a more solid support 431, forming either part of the cradle or attached to the inside thereof. In the embodiment of the invention shown, the cradle 41 is formed by two curved bars 46, by each of the solid supports 431, and by three braces 47A, 47B, and 47C. Seen in the plane of projection of the lengths 10, the cradle 41 has substantially the shape of a curved, closed, elongated rectangle formed by two substantially parallel branches connected together at their ends. The closed structure of the cradle imparts to it strength, rigidity and lightweight features which, in addition to the use of a simple fastening surface 42 of fixed location, insure that the cradle is easy to remove and replace. Note that the cradle can become closed through the fastening means at the time it is attached to the assembly 5, and this variation is within the meaning of "closed" as used herein. The deflectors are mounted within said branches and the fastening surface is arranged on one of said branches, on the side opposite of said deflectors. The deflectors are shaped in such a manner that the distance between each deflector decreases as the projection orifice is approached (see FIG. 2).

The rectangle which the cradle 41 forms leaves a sufficiently long passage for the lengths 10 to pass through. The brace 47C does not interfere with the passing of the length 10 which has just been freed by the knife 3, nor with the passing of the end of the thread which emerges from the outer radial end 21 of the rotary conduit 2. The feed of the thread imparts to it a continuous advance, and just after the cutting by the knife 3, the end of the thread (the length is not designated here) forms a spiral path in the plane of rotation of the conduit 2. The brace 47C must therefore be located radially beyond this path in order not to interfere with the movement of the thread.

The deflectors are arranged in such a manner as to leave between them a slit through which each length of thread can pass forcibly. Each deflector comprises, on the projection-orifice side, an edge 44 which is curved in such a manner as to approach the shape of the receiving surface S onto which the lengths 10 of thread are projected. This edge 44 corresponds to the lower edge of the corresponding metal sheet 430. In this example, the edge closely follows the curve of the crown of a tire, as viewed in planar radial section and forming a typical angle of the crown reinforcement threads. More generally, the trace which the perpendicular projection of each of said edges forms in the plane of rotation of the rotary conduit 2 is non-linear in order to follow more or less closely the curves of the receiving surface.

The dimensions of the fastening surface 42 are substantially smaller than the length of the deflectors measured along said edge 44, that is to say along the slit through which the lengths 10 pass.

The clearance between the edge 44 and the receiving surface S is substantially constant (see FIG. 1). It corresponds, for instance, to two or three times the thickness of a length 10 of thread. Due to the fact that the metal sheet 430 makes it possible to assure a continuous guiding of the length 10 along its entire length, a precise depositing of the length at the desired place is obtained. In practice, it is only the metal sheets 430 which must be cut to the approximate profile of the surface S. Furthermore the rubbing of the lengths 10 on these sheets causes in the long run a certain amount of wear of the sheets. For all of these reasons, it is very practical to be able to replace them. However, in order not to reduce the productivity of the machines, the invention makes it possible to replace the metal sheets on a thread guide which is not mounted on the assembly 5. One thus works on a subassembly (thread guide 4) in the shop, having all the time necessary in order properly to mount and adjust these sheets 430, whereupon this subassembly can be mounted on the machine at the desired time.

The cradle 41 thus constitutes a mechanical support on which all of the parts of the thread guide are combined. Furthermore, it is known that the rotary conduit and the driving members for the thread form an assembly 5 which must approach the surface on which it is desired to manufacture a crown reinforcement and correctly position it in order for the threads to be projected precisely at the desired place. The same is true with respect to the thread guide. The cradle 41 being made integral with said assembly 5, it will be understood that the thread guide 4 precisely follows the movements which a mechanism (not shown) may confer upon the assembly 5 in order to enable it to approach the support on which a tire is manufactured.

I claim:

1. An apparatus for manufacturing a reinforcement from a thread deposited directly at its final place by projecting lengths of thread onto a receiving surface, said apparatus including an assembly comprising:

means for advancing the thread, a rotary conduit fastened on a shaft constituting the axis of rotation of said conduit, so that the outer radial end of said conduit is oriented substantially radially with respect to the axis of rotation, said conduit receiving the thread at its central end opposite said outer radial end coming from said advancing means, said thread emerging through said outer radial end, said advancing means controlling the linear speed of advance of the thread within said rotary conduit, means for driving said rotary conduit in rotation, means for cutting the thread which act on the thread in such a manner as to free a length upon each rotation of said rotary conduit, said apparatus furthermore comprising a thread guide for receiving lengths of thread, said thread guide being positioned with respect to said rotary conduit in such a manner as to receive the thread in the plane of rotation of said conduit, said thread guide having a projection orifice from which the thread can emerge, in which the thread guide is a subassembly which can be mounted on and removed from the assembly as a unit and comprises a cradle having a fastening surface interfacing with a bearing surface of the assembly permitting the detachable mounting of said thread guide to said assembly, said cradle having an elongated opening of limited length through the cradle for accommodating the length of the cut threads, said cradle supporting within said opening a pair of deflectors defining between them at least one elongated inner passage, located in said plane of rotation, through which each length of thread can pass before emerging from the projection orifice.

2. An apparatus according to claim 1, developed for the production in situ of a tire reinforcement during its manufacture, in which each said deflector comprises on the projection-orifice side an edge which is curved in such a manner as to approach the shape of said receiving surface.

3. An apparatus according to claim 1, in which said fastening surface is of smaller dimensions than the length of the deflectors, measured along said elongated inner passage.

4. An apparatus according to claim 1, in which said fastening surface is continuous and entirely circumscribed by a closed line.

5. An apparatus according to claim 1, in which said cradle is an elongated mounting structure defined by two parallel branches connected together at their ends by braces, the parallel branches and end braces defining a closed, elongated rectangle when viewed from above, said deflectors being mounted on the inside of said branches, and the fastening surface extending from one of said branches, on the side opposite one of said deflectors.

6. An apparatus according to claim 1, in which the distance between each deflector decreases upon approaching the projection orifice.

7. An apparatus according to claim 1, in which each deflector comprises on the projection orifice an edge and in which the trace which the perpendicular projection of each of said edges forms in the plane of rotation is non-linear.

* * * * *